US008857290B2

(12) United States Patent
Sugiura et al.

(10) Patent No.: US 8,857,290 B2
(45) Date of Patent: Oct. 14, 2014

(54) LINK CONNECTING STRUCTURE OF OPERATING PEDAL DEVICE FOR VEHICLE

(75) Inventors: Hikaru Sugiura, Toyota (JP); Isao Yagi, Toyota (JP); Shuji Kohama, Toyota (JP)

(73) Assignee: Toyota Iron Works Co., Ltd., Toyota-shi, Aichi-ken (JP)

( * ) Notice: Subject to any disclaimer, the term of this patent is extended or adjusted under 35 U.S.C. 154(b) by 201 days.

(21) Appl. No.: 12/647,103

(22) Filed: Dec. 24, 2009

(65) Prior Publication Data
US 2010/0186540 A1    Jul. 29, 2010

(30) Foreign Application Priority Data

Dec. 25, 2008  (WO) .................. PCT/JP2008/073637

(51) Int. Cl.
G05G 1/44      (2008.04)
B60T 7/06      (2006.01)
G05G 1/50      (2008.04)
B60T 11/18     (2006.01)

(52) U.S. Cl.
CPC .................. G05G 1/506 (2013.01); G05G 1/44 (2013.01); B60T 7/06 (2013.01); B60T 11/18 (2013.01)
USPC ............................................ 74/512; 411/504

(58) Field of Classification Search
CPC ............. G05G 1/36; G05G 1/44; G05G 1/46; G05G 1/487; G05G 1/506; B60T 11/18; B60T 7/06
USPC ............ 74/512, 513, 516, 518, 560; 411/501, 411/504
See application file for complete search history.

(56) References Cited

U.S. PATENT DOCUMENTS

| 446,466 | A | * | 2/1891 | Platt ............................... 411/501 |
| 1,410,111 | A | * | 3/1922 | Myers ............................... 74/512 |
| 1,874,415 | A | * | 8/1932 | Atwood ........................... 29/11 |
| 2,240,783 | A | * | 5/1941 | Jandus ............................ 74/520 |

(Continued)

FOREIGN PATENT DOCUMENTS

JP         64-034531      2/1989
JP         1-123727       8/1989

(Continued)

OTHER PUBLICATIONS

Patent Examination Report No. 1 for Australian Patent Appl. No. 2008365779 dated Mar. 18, 2013 (4 pages).

(Continued)

*Primary Examiner* — Thomas Diaz
(74) *Attorney, Agent, or Firm* — Finnegan, Henderson, Farabow, Garrett & Dunner, LLP

(57) ABSTRACT

A link connecting structure of an operating pedal device for a vehicle includes a connecting pin used for at least one of connections of a connecting link to an operating pedal and to a pivot member, a disengagement-preventing portion formed by plastically deforming a tip portion of a shaft of the connecting pin passed through the connecting link and the operating pedal or the pivot member and a predetermined space formed between the connecting link with the operating pedal or the pivot member and the disengagement-preventing portion. The tip portion has a larger diameter locally than the initial diameter of the shaft. The predetermined space allows the connecting link and the operating pedal or the pivot member to be pivoted relative to each other.

3 Claims, 3 Drawing Sheets

(56) References Cited

U.S. PATENT DOCUMENTS

| | | | | |
|---|---|---|---|---|
| 2,809,725 | A | * | 10/1957 | Ayers, Jr. ................ 188/357 |
| 3,025,713 | A | * | 3/1962 | Koshaba et al. ............ 74/478 |
| 3,953,064 | A | * | 4/1976 | McHenry .................. 292/184 |
| 4,177,545 | A | * | 12/1979 | Lambertz ..................... 29/11 |
| 4,294,036 | A | * | 10/1981 | Wion ........................ 446/135 |
| 4,823,921 | A | * | 4/1989 | Bosco .................... 188/250 G |
| 2003/0106392 | A1 | * | 6/2003 | Willemsen ................. 74/512 |

FOREIGN PATENT DOCUMENTS

| | | |
|---|---|---|
| JP | 2634413 | 4/1997 |
| JP | 9-112559 | 5/1997 |
| JP | 2756145 | 3/1998 |
| JP | 11-115699 | 4/1999 |
| JP | 2002-283976 | 10/2002 |
| JP | 2007-223485 | 9/2007 |

OTHER PUBLICATIONS

Extended European Search Report for EP Appl. No. 08879143.9 dated Apr. 4, 2013 (6 pages).

English translation of First Office Action for Chinese Appl. No. 200880132842.5 dated May 9, 2013 (3 pages).

Reasons for Rejection for Japanese Appl. No. 2010-543685 dated Jun. 4, 2013 (2 pages).

* cited by examiner

LINK CONNECTING STRUCTURE OF OPERATING PEDAL DEVICE FOR VEHICLE

BACKGROUND OF THE INVENTION

1. Field of the Invention

The present invention relates to a link connecting structure of an operating pedal device for a vehicle, and particularly relates to a link connecting structure that can be constructed with a small number of components at low cost.

2. Description of the Related Art

A known operating pedal device for a vehicle comprises (a) an operating pedal that is pivotally mounted about a first axis and is operated to be depressed by a driver, and (b) a pivot member that is pivotally mounted about a second axis parallel to the first axis and is connected to the operating pedal through a connecting link to mechanically pivot about the second axis in accordance with the depressing operation of the operating pedal. In such an operating pedal device for a vehicle, as (c) a link connecting mechanism that pivotably connects the connecting link relative to the operating pedal and to the pivot member a link connecting structure is sometimes used. Such link connecting structure includes a connecting pin used for at least one of the connections of the connecting link to the operating pedal and to the pivot member. The connecting pin has a large-diameter head and a cylindrical shaft that passes through the connecting link and the operating pedal or the pivot member. In such a connecting pin, the shaft has a disengagement-preventing portion formed at the tip portion thereof which prevents the connecting pin from disengaging to the large-diameter head side. Patent Document 1 (JP-A-2002-283976) and Patent Document 2 (JP-A-11-115690) describe examples of such operating pedal devices for a vehicle, to which an E ring or a β pin is applied as the disengagement-preventing portion. Further, Patent Document 3 (JP-U-01-123727) describes a connecting structure of a supporting portion for pivotally attaching an operating pedal for a vehicle to a bracket. According to the disclosed technique, the tip portion of the supporting pin is caulked and integrally fixed to the bracket.

However, means that use the E ring or the β pin as the disengagement-preventing portion, as descried in Patent Documents 1 and 2, require a larger number of components. In addition, a slot for applying the E ring or a hole to allow the β pin to pass therethrough has to be formed in the shaft of the connecting pin, which results in a higher manufacturing cost. Further, application of such an E ring or a β pin can hardly be automated, and they have been installed manually. This further increases the manufacturing cost.

Meanwhile, caulking as described in Patent Document 3 may possibly be applied to prevent the connecting pin from disengaging. However, caulking is generally a technique of upset forging leaving no space, and therefore, in order to make a connection in a relatively pivotable manner, it is necessary to use a stepped connecting pin or interpose a collar. Thus, in terms of decreasing the number of components or reducing the manufacturing cost, sufficient effects cannot necessarily be obtained.

The invention was accomplished against the above background. An object thereof is to allow a link connecting structure of an operating pedal device for a vehicle, in which a plurality of components are connected in a relatively pivotable manner by a connecting pin, to be constructed with a small number of components at low cost.

SUMMARY OF THE INVENTION

To achieve the purpose, a first aspect of the invention is a link connecting structure of an operating pedal device for a vehicle, comprising: (a) an operating pedal that is pivotally mounted about a first axis and is operated to be depressed by a driver, and (b) a pivot member that is pivotally mounted about a second axis parallel to the first axis and is connected to the operating pedal through a connecting link to be mechanically pivoted about the second axis in accordance with the depressing operation of the operating pedal, (c) the link connecting structure pivotablly connecting the connecting link relative to the operating pedal and to the pivot member and using a connecting pin for at least one of the connections of the connecting link to the operating pedal and to the pivot member, (d) the connecting pin having a large-diameter head and a cylindrical shaft that passes through the connecting link and the operating pedal or the pivot member, (e) the shaft having a disengagement-preventing portion, formed at the tip portion thereof, which prevents the connecting pin to be disengaged to the large-diameter head side, (f) the disengagement-preventing portion being formed by plastic deformation with the shaft passing through the connecting link and the operating pedal or the pivot member, so that the tip portion is crushed in the axial direction, whereby the tip portion has a larger diameter than the initial diameter of the shaft, and (g) with the connecting link, the operating pedal or the pivot member, and the large-diameter head being closely attached to one another, the link connecting structure having a predetermined space formed between the connecting link with the operating pedal or the pivot member and the disengagement-preventing portion, so as to allow relative pivoting of the connecting link and the operating pedal or the pivot member.

A second aspect of the invention is the link connecting structure of an operating pedal device for a vehicle according to the first invention, characterized in that the connecting link is mounted pairwise on both sides of the operating pedal and the pivot member in a manner where the operating pedal and the pivot member are put between the pair of the connecting links, and the portion of the shaft of the connecting pin in the vicinity of the large-diameter head has a larger diameter and is integrally press-fitted into one of the pair of connecting links, which is on the large-diameter head side.

In such a link connecting structure of an operating pedal device for a vehicle, with the shaft of the connecting pin passing through the connecting link and the operating pedal or the pivot member, the tip portion thereof is subjected to roll caulking or like plastic deformation processing. As a result, with the connecting link, the operating pedal or the pivot member, and the large-diameter head being closely attached to one another, plastic deformation is performed so that the tip portion has a larger diameter corresponding to the disengagement-preventing portion, in such a manner that a predetermined space is formed between the connecting link with the operating pedal or the pivot member and the disengagement-preventing portion. Accordingly, unlike the conventional, ordinary caulking, owing to the presence of the space, relative pivotal movement is allowed between the connecting ring and the operating pedal or the pivot member.

According to the invention, just plastic deformation of the tip portion of the shaft enables a connection without interfering with relative pivotal movement of the connecting link and the operating pedal or the pivot member. Therefore, a process to form the disengagement-preventing portion for the connecting pin, that is, plastic deformation processing, can be easily automated. Further, a disengagement-preventing component, such as E ring, is not required, and a slot or the like for applying the component does not have to be formed. As a result, the link connecting structure of an operating pedal device for a vehicle can be constructed with a small number of components at low cost.

According to the second aspect of the invention, the portion of the shaft of the connecting pin in the vicinity of the large-diameter head has a larger diameter and is integrally press-fitted into the connecting link that is on the large-diameter head side. Accordingly, even in the case where a component force is generated in the transverse direction relative to the axis of the shaft at the time of subjecting a plastic deformation to the tip portion of the shaft of the connecting pin, the connecting pin can be easily positioned with high accuracy through the connecting link.

DETAILED DESCRIPTION OF THE INVENTION

Figure 1:
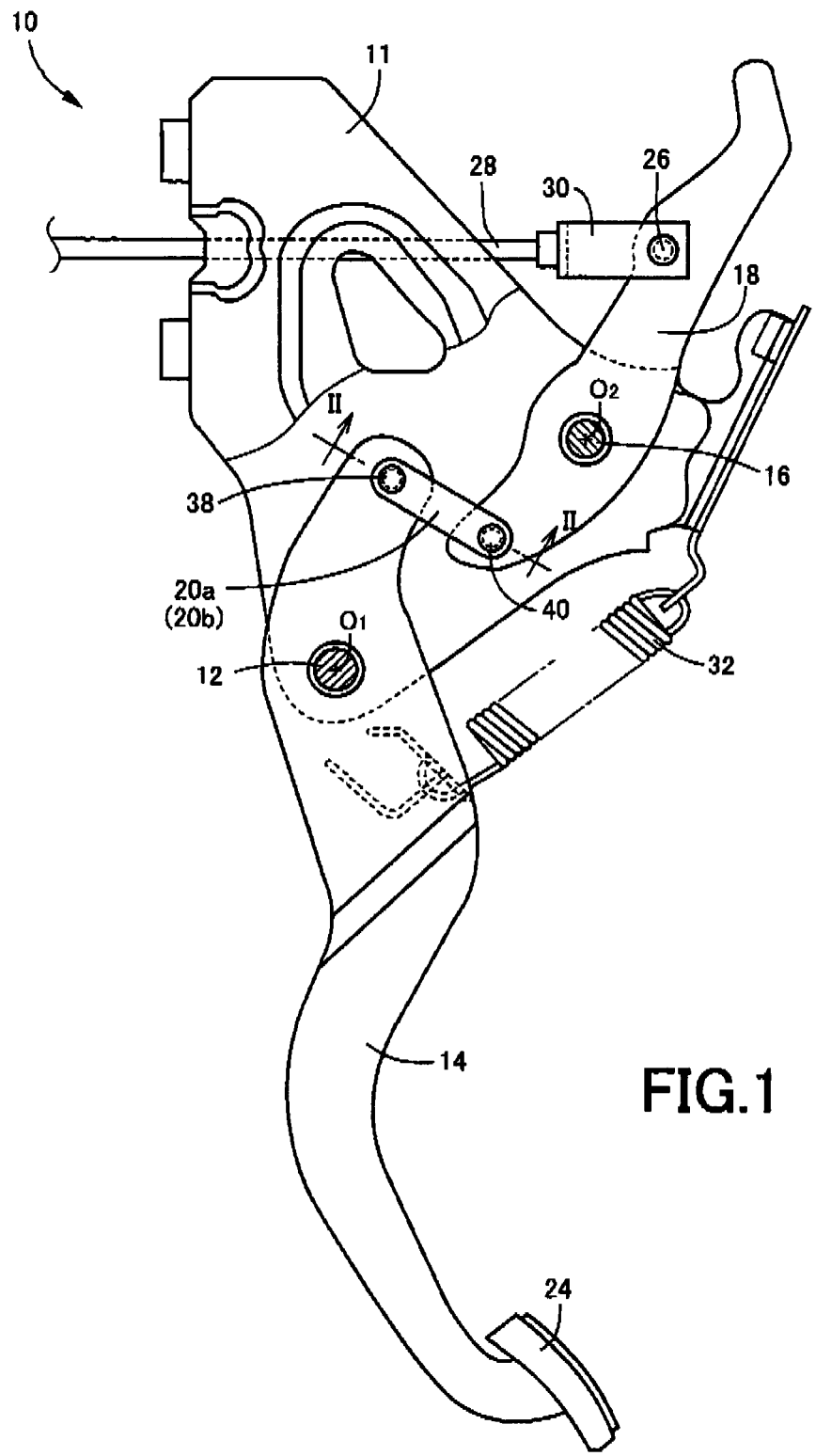
FIG. 1 is a diagram showing a front view of a brake pedal device for a service braking of a vehicle, according to the invention.

The invention is preferably applied to a connecting part of a connecting link of an operating pedal device for a vehicle such as a brake pedal for service brake device or parking brake device, an accelerator pedal, a clutch pedal, or the like. Various embodiments are applicable therefore, for example, with respect to the pivot member, to which a push rod of a brake master cylinder, an accelerator cable, or the like is connected, the structure may be such that a predetermined reaction force is applied to the pivot member according to depressing strokes, using a simulation device provided with a biasing means such as a spring.

With respect to the connecting link that connects the operating pedal and the pivot member, a pair of connecting links are preferably provided on both sides of the operating pedal and the pivot member, as in the second aspect of the invention. However, it is also acceptable that one connecting link is provided on one side. According to the second aspect of the invention, the connecting pin is press-fitted into one connecting link. However, according to the first aspect of the invention, the connecting pin does not necessarily have to be press-fitted, and may also pass therethrough in a relatively pivotable manner.

As a processing method for crushing the tip portion of the shaft of the connecting pin in the axial direction to plastically deform the same, roll caulking is preferably employed, for example. Roll caulking is performed using a spin head mounted concentrically with an axis of the connecting pin and also a punch provided inclined to an axis of the spin head. The spin head is rotated about the axis so that the punch is, with precession (also called conical movement), pressed in the axial direction by an air cylinder or the like, whereby the punch is pressed against the tip of the shaft of the connecting pin to achieve plastic deformation. A contact area between the punch and the shaft is small, then caulking process is executed while causing local plastic deformation of the tip of the shaft. Therefore, only the tip portion can be locally plastically deformed to enlarge the diameter thereof, without deforming other parts of the shaft. Accordingly, a disengagement-preventing portion (enlarged-diameter portion) can be formed in such a manner that a predetermined space is formed between the connecting link with the operating pedal or the pivot member and the disengagement-preventing portion.

As materials for the connecting pin, plastically deformable metal materials are employed. The number of the above-mentioned punches may be one, but it is also acceptable to symmetrically provide a pair of punches about the axis or provide three or more punches. Such a punch is preferably mounted rotatably about its own axis. As long as only the tip portion of the shaft of the connecting pin can be locally plastically deformed to enlarge the diameter thereof without deforming other parts of the shaft, not only roll caulking but also press caulking and other processing methods are also applicable.

When the above-mentioned roll caulking is performed as plastic deformation processing, a component force is generated in the transverse direction relative to the axis of the shaft of the connecting pin to which the roll caulking is subjected. In order to deal with this situation, for example, as in the second aspect of the invention, the position of the connecting pin is preferably set by integral press-fitted into one connecting link, and the like, so as to prevent the connecting pin from falling or rattling at the time of forming a disengagement-preventing portion by roll caulking.

The maximum diameter $D_A$ of the disengagement-preventing portion (enlarged-diameter portion) formed by the above-mentioned roll caulking or like plastic deformation processing is suitably determined within a range where the disengagement-preventing portion cannot be disengaged from a connecting pin through hole provided in the connecting link, the operating pedal or the pivot member. For example, in the case where the initial diameter $D_0$ of the shaft is approximately the same as the diameter of the connecting pin through hole, when the maximum diameter $D_A$ of the disengagement-preventing portion is not less than $1.02 D_0$, a load for preventing disengagement can be applied to the disengagement-preventing portion which is comparable to that in the conventional case of using an E ring as a disengagement preventing means.

With the connecting link and the operating pedal or the pivot member, which are connected by the connecting pin (hereinafter referred to as "components that are connected by the connecting pin"), and the large-diameter head of the connecting pin being closely attached to one another, a space is formed between the components that are connected by the connecting pin adjoining the disengagement-preventing portion and the disengagement-preventing portion. The space, that is, a difference between an amount of a distance from the disengagement-preventing portion to the large-diameter head (length of the shaft) and a total amount of board thickness of the whole components (connecting link and operating pedal, or connecting link and pivot member) that are connected by the connecting pin, is defines as $\rho$. The space $\rho$ is suitably set so as not to interfere with the relative pivoting of the components that are connected by the connecting pin and also not to give too much freeplay that would cause rattling or prying. The suitable range is, for example, 0 mm$<\rho\le$about 6.0 mm, although this depends on the material of the connecting pin, and the like.

The disengagement-preventing portion is formed by plastic deformation processing, with the large-diameter head of the connecting pin and the components that are connected by the connecting pin being closely attached to one another, so that a predetermined space $\rho$ is formed between the disengagement-preventing portion and the components that are connected by the connecting pin adjoining the disengagement-preventing portion. However, at the time of plastic deformation processing, the large-diameter head of the connecting pin and the components that are connected by the connecting pin do not necessarily have to be closely attached to one another. That is, what is required is that the amount of the distance between the disengagement-preventing portion and the large-diameter head (length of the shaft) be eventually larger than the total amount of board thickness of the whole components that are connected by the connecting pin by the size of space ρ. For example, at the time of plastic deformation processing, when a predetermined space is present between the large-diameter head of the connecting pin and the components that are connected by the connecting pin, plastic deformation processing may be performed so that, between the disengagement-preventing portion and the components that are connected by the connecting pin adjoining the disengagement-preventing portion, a gap is formed whose size is smaller than the size of the space ρ by a size of the predetermined space. Roll caulking may also be performed in the presence of space(s) between the components that are connected by the connecting pin.

Hereafter, an embodiment of the invention is described in detail with reference to the drawings.

In FIG. 1 showing a front view of a brake pedal device 10 for a service braking of a vehicle according to the invention, an operating pedal 14 is pivotally mounted on a pedal support 11 that is integrally fixed to a vehicle about the axis $O_1$ of a substantially horizontal first supporting axis 12. A pivot member 18 is mounted pivotally about the axis $O_2$ of a second supporting shaft 16 substantially parallel to the axis $O_1$. Astride the operating pedal 14 and the pivot member 18, a pair of connecting links 20a and 20b are mounted on the opposite sides of the operating pedal 14 and the pivot member 18 (front and back sides of a drawing sheet of FIG. 1). The axis $O_1$ of the first supporting shaft 12 corresponds to a first axis, and the axis $O_2$ of the second supporting shaft 16 corresponds to a second axis. In FIG. 1, in order to clearly show the connecting part formed by the connecting links 20a and 20b, a side plate of the pedal support 11 on the front side is partially cut away.

When a pedal sheet 24 provided at the lower end of the operating pedal 14 is operated to be depressed by a driver, the operating pedal 14 is caused to pivot in the clockwise direction about the first supporting shaft 12 in FIG. 1. Through the connecting links 20a and 20b connected at the upper end portion of the operating pedal 14, this pivotal movement causes the pivot member 18 to mechanically pivot in the counterclockwise direction about the second supporting shaft 16. A push rod 28 of a brake master cylinder is connected to the upper end portion of the pivot member 18 through a clevis 30 in relatively pivotable manner about the axis of a connecting pin 26 that is substantially parallel to the second supporting shaft 16. With the pivotal movement of the pivot member 18, the push rod 28 is mechanically pressed leftward in FIG. 1. In this manner, oil pressure for hydraulic brake is generated according to the depressing operation force on the operating pedal 14. The push rod 28 is biased in a direction projecting from the brake master cylinder, and a return spring 32 is tensioned between the operating pedal 14 and the pedal support 11. Accordingly, when the pedal sheet 24 is released from the depressing operation, the biasing force allows the pivot member 18 to pivot reversely in the clockwise direction about the axis $O_2$ of the second supporting shaft 16. At the same time, the operating pedal 14 is caused to pivot about the axis $O_1$ of the first supporting shaft 16 reversely in the counterclockwise direction, and is maintained at the original position shown in FIG. 1.

Figure 2:
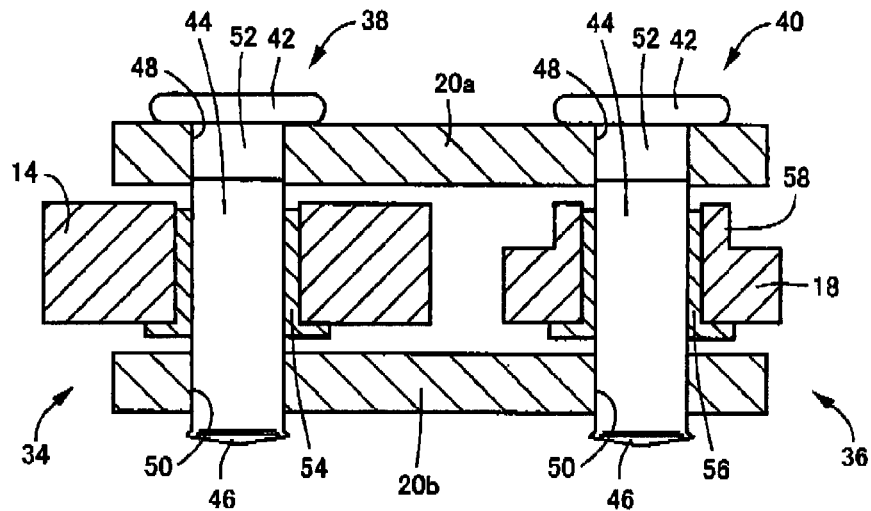
FIG. 2 is a diagram showing an enlarged view of the section in FIG. 1.

In FIG. 2 showing an enlarged sectional view of the II-II section in FIG. 1, the connecting links 20a and 20b that connect the operating pedal 14 and the pivot member 18 are mounted on the both sides of the operating pedal 14 and the pivot member 18 such that the operating pedal 14 and the pivot member 18 are put between the connecting links 20a and 20b. The connecting links 20a and 20b and the operating pedal 14, as well as the connecting links 20a and 20b and the pivot member 18, are connected in a relatively pivotable manner by the connecting pins 38 and 40, respectively.

The connecting links 20a and 20b have connecting pin through holes 48 and 50 formed therein, respectively. The connecting pin through holes 48 and 50 each are formed with an inner diameter substantially equal to the outside diameter of a shaft 44, and the shaft 44 is passed through each of the connecting pin through holes 48 and 50. At the portion of the shaft 44 in the vicinity of the large-diameter head 42, a press-fitting portion 52 is provided. The press-fitting portion 52 has a slightly larger diameter than other parts of the shaft 44 and is integrally press-fitted into the connecting link 20a. The shaft 44 has a constant diameter at other parts of the shaft 44 than the press-fitting portion 52, and passes through the connecting pin through hole 50 of the connecting link 20b in a relatively pivotable manner. Further, metal bushes 54 and 56 are disposed between the operating pedal 14 and the shaft 44 of the connecting pin 38 and between the pivot member 18 and the shaft 44 of the connecting pin 40, respectively. The pivot member 18 is integrally provided with a boss 58 for preventing rattling due to the difference in board thickness from the operating pedal 14.

The connecting pins 38 and 40 have the same structure, and each have the large-diameter head 42 and the cylindrical shaft 44 concentrically and integrally. The shafts 44 are mounted so as to pass through the connecting pin through holes 48 and 50 of the connecting links 20a and 20b, respectively, and also through the metal bush 54 of the operating pedal 14 and the metal bush 56 of the pivot member 18, respectively. The shafts 44 each have a disengagement-preventing portion 46 formed at the tip portions thereof projecting to opposite side (lower part in the figure) from the connecting pin through holes 48 and 50 of the connecting links 20a and 20b and also from the metal bush 54 of the operating pedal 14 and the metal bush 56 of the pivot member 18. Accordingly, the connecting pins 38 and 40 are prevented from disengagement to the large-diameter head 42 side. The disengagement-preventing portion 46 herein is formed by plastic deformation with the shaft 44 of the connecting pins 38 and 40 passing through the connecting pin through holes 48 and 50 of the connecting links 20a and 20b and the metal bush 54 of the operating pedal 14 or the metal bush 56 of the pivot member 18, such that the tip portion is crushed in the axial direction of the connecting pins 38 and 40. The disengagement-preventing portion 46 is thus an enlarged-diameter portion having a larger diameter than the initial diameter $D_0$ of the shaft 44. Further, the disengagement-preventing portions 46 are formed by roll caulking with the large-diameter heads 42 of the connecting pins 38 and 40 and the components that are connected by the connecting pins being closely attached to one another (see FIG. 3), in such a manner that a predetermined space ρ (see FIG. 4B) is formed between each disengagement-preventing portion 46 and the components that are connected by the connecting pins adjoining the disengagement-preventing portion 46. Owing to the presence of the space ρ, relative pivotal movement is allowed between the connecting links 20a and 20b and the operating pedal 14 or the pivot member 18, which are the components that are connected by the connecting pins.

Figure 3:
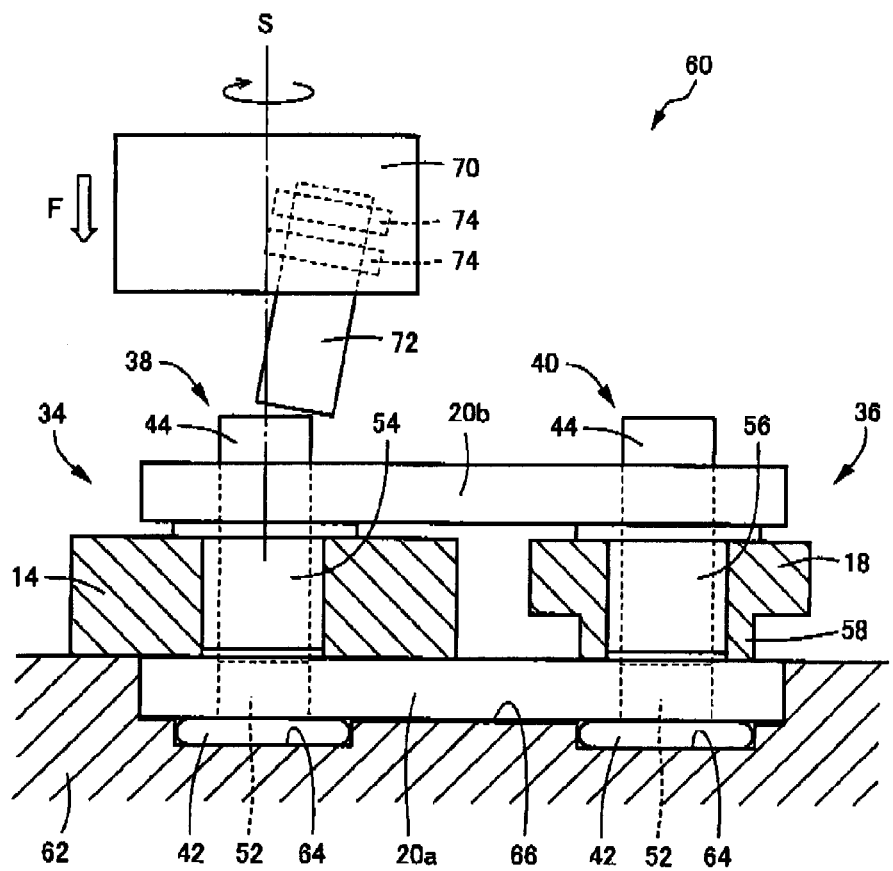
FIG. 3 is a schematic diagram explaining a roll caulking apparatus to perform roll caulking on a connecting pin that is mounted on a link connecting structure of the brake pedal device of FIG. 1.

FIG. 3 is a schematic diagram explaining the roll caulking apparatus 60 to perform the above-mentioned roll caulking, and shows a state before the formation of the disengagement-preventing portion 46. One connecting link 20a with connecting pins 38 and 40 which are press-fitted thereinto is mounted on a positioning jig 62 in a manner such that the shafts 44 of the connecting pins 38 and 40 face upwards. On the upper surface of the positioning jig 62, a pair of supporting recesses 64 and a positioning recess 66 are provided. On the pair of supporting recesses 64, the connecting pins 38 and 40 are mounted in such a manner that the supporting recesses 64 are in contact with the large-diameter heads 42 thereof, while the positioning recess 66 accommodates the connecting link 20a and sets the position of the horizontal direction. The metal bushes 54 and 56, as well as the operating pedal 14 and the pivot member 18, are installed from above of the shafts 44 on the shafts 44 of the connecting pins 38 and 40 facing upwards, respectively. The other connecting link 20b is further installed thereon. In such a state, the connecting link 20b and other components are pressed against the positioning jig 62 by a non-illustrated clamp, and they are integrally fixed.

Figures 4A, 4B:
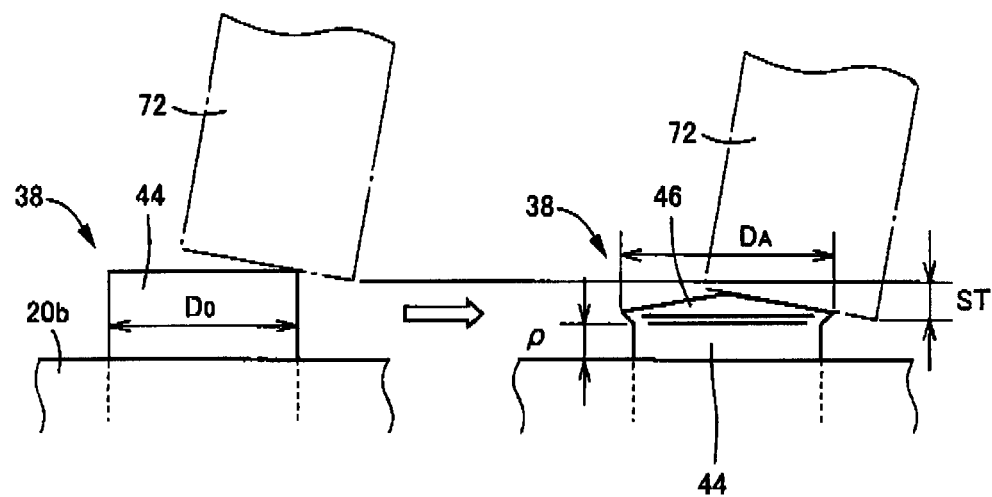
FIG. 4 is a diagram showing a comparison before and after the formation of a large-diameter disengagement-preventing portion at the tip portion of a connecting pin using the roll caulking apparatus of FIG. 3.

A spin head 70 is mounted above the positioning jig 62. The spin head 70 is rotated about the axis S in the vertical direction by a rotation drive unit, such as motor. The spin head 70 is provided with a punch 72 inclined at a predetermined angle to the axis S. The punch 72 is mounted on the spin head 70 by a bearing 74 rotatably about its own axis. When the spin head 70 is rotated about the axis S, the punch 72 thereby undergoes precession (also referred to as conical movement) about the axis S. Then, at the position where the axis of one connecting pin 38 is in substantial agreement with the axis S, the spin head 70 is moved, while being rotated, downwards by a non-illustrated pressing device, such as air cylinder, under a predetermined press load F. The punch 72 is consequently pressed in a posture inclined toward the tip of the shaft 44 of the connecting pin 38, and undergoes, precession about the axis S, while rotating about its own axis, by friction. Accordingly, the tip portion of the shaft 44 is crushed in the axial direction and thus plastically deformed, as shown in FIG. 4A and FIG. 4B, thereby forming the disengagement-preventing portion 46.

According to such roll caulking, the contact area between the punch 72 and the shaft 44 is small, and caulking proceeds while causing local plastic deformation of the tip of the shaft 44. Therefore, only the tip portion can be locally plastically deformed to enlarge the diameter thereof, without deforming other parts of the shaft 44. Accordingly, as shown in FIG. 3, with the components connected by the connecting pin 38, that is, the connecting links 20a and 20b and the operating pedal 14, being closely attached to one another and also closely attached to the large-diameter head 42, a predetermined space $\rho$ is formed between the upper surface of the topmost connecting link 20b, which is one of the components connected by the connecting pin 38, and the disengagement-preventing portion 46, as shown in FIG. 4B. Owing to the presence of the space $\rho$, relative pivotal movement is allowed between the components that are connected by the connecting pins, that is, the connecting links 20a and 20b and the operating pedal 14. The size of the space $\rho$, that is, the difference between the amount of the distance from the disengagement-preventing portion 46 to the large-diameter head 42 (the length of the shaft 44) and the amount of the total board thickness of the whole components connected by the connecting pin 38 is suitably determined from the following viewpoints. Specifically, the size is determined so as not to interfere with relative pivotal movement of the components connected by the connecting pin 38, thereby impairing the depressing operation properties of the operating pedal 14; at the time of roll caulking, not to cause deformation of the shaft 44 of the connecting pin 38 or deteriorate the degree of perpendicularity of the connecting pin 38 relative to the connecting link 20a, impairing the mountability of the connecting link 20b; and not to give too much freeplay that would cause rattling of the components connected by the connecting pin 38 or prying thereby. The suitable range is 0 mm<$\rho$≤about 6.0 mm, for example. In the present embodiment, considering errors in installation, strength at the time of operation, and the like, the size is within a range of 0.4 mm≤$\rho$≤4.0 mm. The maximum diameter $D_A$ of the disengagement-preventing portion 46 formed by roll caulking is suitably set within the range where disengagement from the connecting pin through hole 50 provided in the connecting link 20b does not occur. For example, relative to the initial diameter $D_0$ of the shaft 44, when the maximum diameter $D_A$ is not less than 1.02 $D_0$, the load for preventing disengagement can be applied to the disengagement-preventing portion 46 which is comparable to that in the conventional case of using the E ring as the disengagement-preventing means. The processing stroke ST of the spin head 70 is set so as to obtain a disengagement-preventing portion 46 with such a maximum diameter $D_A$, and the initial axial length of the shaft 44 is set according to the processing stroke ST to create a space $\rho$.

After roll caulking is completed on the tip of the shaft 44 of one connecting pin 38, then roll caulking is performed on the tip of the shaft 44 of the other connecting pin 40 in the same manner to form the disengagement-preventing portion 46. A pair of spin heads 70 may also be provided corresponding to the distance between the pair of connecting pins 38 and 40, and roll caulking may be performed simultaneously on such connecting pins 38 and 40.

In link connecting structures 34 and 36 of the brake pedal device of the present embodiment, roll caulking is performed on the tip portions of the shafts 44 of the connecting pins 38 and 40, with the shafts 44 passing through the connecting pin through holes 48 or 50 of the connecting links 20a and 20b, and also through the metal bush 54 of the operating pedal 14 and the metal bush 56 of the pivot member 18. As a result of such processing, with the large-diameter heads 42 of the connecting pins 38 and 40 and the components that are connected by the connecting pins being closely attached to one another, plastic deformation is performed so that the tip portions have a larger diameter to give the disengagement-preventing portions 46, in such a manner that a predetermined space $\rho$ is formed between the disengagement-preventing portion of each connecting pin and the components that are connected by the connecting pin adjoining the disengagement-preventing portion. Accordingly, unlike the conventional, ordinary caulking, owing to the presence of the space $\rho$, relative pivotal movement is allowed between the components that are connected by the connecting pins 38 and 40, respectively. Then, a forming process of the disengagement-preventing portions, that is, roll caulking, of the connecting pins 38 and 40 can be easily automated. Further, a disengagement-preventing component, such as E ring, is not required, and a slot or the like for installing the component on the shafts 44 of the connecting pins 38 and 40 does not have to be formed. Accordingly, the link connecting structures 34 and 36 can be constructed with a small number of components at low cost. Roll caulking can be easily automated as follows, for example. Specifically, the processing stroke ST is preset, and NC control or the like is employed to give roll caulking in such processing stroke.

Further, in general roll caulking, because a force is generated in the transverse direction relative to the axes of the shafts 44 of the connecting pins 38 and 40 that are the subject of caulking, positioning of the connecting pins 38 and 40 has to be performed to prevent falling or rattling. However, in the present embodiment, large-diameter press-fitting portions 52 are provided at the portions of the shafts 44 of the connecting pins 38 and 40 in the vicinity of the large-diameter heads 42, and are integrally press-fitted into the connecting link 20a that is on the large-diameter head 42 side. Accordingly, positioning of the connecting pins 38 and 40 at the time of roll caulking on the tip portion of a shaft 44 can be easily performed at high accuracy through the connecting link 20a. In the present embodiment, the connecting link 20a is mounted on the positioning jig 62 with the large-diameter head 42 being in contact with the upper surface of the supporting recess 64. With respect to the horizontal position, the position of the connecting link 20a is set by the positioning recess 66, and the other connecting link 20b is installed thereon. In such a state, the components are integrally fixed to the positioning jig 62 by a non-illustrated clamp. Accordingly, under no influence of the transverse component force, roll caulking can be properly performed with the shaft 44 being positioned in a constant, substantially perpendicular posture.

The above explains one embodiment of the present invention in detail based on the drawings; however, this is merely one embodiment of the invention, and various modifications and improvements are possible based on the knowledge of those skilled in the art.

What is claimed is:

1. A link connecting structure of an operating pedal device for a vehicle, comprising:
    an operating pedal that is pivotally mounted about a first axis and is operated to be depressed by a driver,
    a pivot member that is pivotally mounted about a second axis parallel to the first axis and is operatively connected to the operating pedal to be mechanically pivoted about the second axis in accordance with the depressing operation of the operating pedal,
    a connecting link pivotally connected relative to the operating pedal and to the pivot member, and through which the pivot member is connected to the operating pedal,
    a connecting pin used for at least one of the pivotal connections between the connecting link and the operating pedal or the pivotal member,
    the connecting pin having a head and a cylindrical shaft that passes through the connecting link and the operating pedal or the pivot member and that has a substantially constant diameter,
    a disengagement-preventing portion formed by plastically deforming a tip portion of the shaft passed through the connecting link and the operating pedal or the pivot member so that the tip portion is pressed inclining relative to the axial direction to be crushed, the disengagement-preventing portion preventing the connecting pin to be disengaged to the head side, and the tip portion being formed into a conic shape without deforming any other portion of the shaft other than the tip portion and having a larger diameter locally than the initial diameter of the shaft,
    a predetermined space formed between the connecting link with the operating pedal or the pivot member and the disengagement-preventing portion, while the connecting link, the operating pedal or the pivot member, and the head are contiguously attached to one another, such that the connecting link and the disengagement-preventing portion are not contacted with each other, and the predetermined space allowing the connecting link and the operating pedal or the pivot member to be pivoted relative to each other,
    the connecting link being mounted pairwise on both sides of the operating pedal and the pivot member such that the operating pedal and the pivot member are put between the pair of the connecting links, and
    a portion of the shaft of the connecting pin adjacent to the head, the portion having a larger diameter than a diameter of other portions of the shaft of the connecting pin and being integrally press-fitted into one of the pair of connecting links which is on the head side of the connecting pin.

2. The link connecting structure of an operating pedal device for a vehicle according to claim 1, wherein a size of the space ranges from 0.4 mm to 4.0 mm.

3. The link connecting structure of an operating pedal device for a vehicle according to claim 1, wherein the head of the connecting pin contacts one of the pair of connecting links which is on the head side.

* * * * *